United States Patent
Kawanishi et al.

(12)

(10) Patent No.: US 6,791,733 B2
(45) Date of Patent: Sep. 14, 2004

(54) RESONANCE TYPE OPTICAL MODULATOR USING SYMMETRIC OR ASYMMETRIC ELECTRODE

(75) Inventors: Tetsuya Kawanishi, Koganei (JP); Masayuki Izutsu, Koganei (JP); Kenichi Kubodera, Tokyo (JP)

(73) Assignees: National Institute of Information and Communications Technology, Koganei (JP); Sumitomo Osaka Cement Co., Ltd., Tokyo (JP)

( * ) Notice: Subject to any disclaimer, the term of this patent is extended or adjusted under 35 U.S.C. 154(b) by 323 days.

(21) Appl. No.: 10/092,628

(22) Filed: Mar. 8, 2002

(65) Prior Publication Data
US 2002/0154378 A1 Oct. 24, 2002

(30) Foreign Application Priority Data

Mar. 9, 2001 (JP) ........................................ 2001-067383
Mar. 9, 2001 (JP) ........................................ 2001-067384

(51) Int. Cl.[7] .......................... G02F 1/03; G02F 1/035; G02F 1/295
(52) U.S. Cl. ........................ 359/245; 359/248; 359/254; 385/2; 385/8
(58) Field of Search ................................ 359/245, 248, 359/254, 276, 278, 279, 315; 385/1, 2, 3, 4, 8

(56) References Cited

U.S. PATENT DOCUMENTS 6,424,754 B1 * 7/2002 Carrott et al. ................. 385/2
6,504,640 B2 * 1/2003 Gopalakrishnan ........... 359/245

2003/0156312 A1 * 8/2003 Kawanishi et al. ......... 359/248

FOREIGN PATENT DOCUMENTS

JP         9-230296      9/1997
JP         2001-51245    2/2001

* cited by examiner

Primary Examiner—Georgia Epps
Assistant Examiner—Jack Dinh
(74) Attorney, Agent, or Firm—Oblon, Spivak, McClelland, Maier & Neustadt, P.C.

(57) ABSTRACT

A resonance type optical modulator includes an optical path having electro-optical effect characteristics, a modulation electrode formed along the optical path for applying an electric field to the optical path, a common electrode formed in opposition to the modulation electrode, a feeding line that is connected to the modulation electrode and stubs connected to the feeding line, wherein the feeding line, stubs and common electrode are provided on one side of a region that is divided by the modulation electrode. A specific example is a resonance type optical modulator using a symmetric or an asymmetric electrode, that includes an optical path having electro-optical effect characteristics, a first stub (an open stub) (an open-ended asymmetric coplanar waveguide) or a short stub (a short-ended asymmetric coplanar waveguide), a second stub (an open or short stub) connected to the first stub, a feeding line connected to the first and second stubs and a common electrode, wherein the first and second stubs are formed along a single optical path to comprise a modulation electrode for applying an electric field to the optical path. As a result, the modulator has a configuration easy to fabricate without damaging the effective modulation field strength applied to the optical path, making it possible to realize high modulation efficiency with a low level of electric power.

23 Claims, 18 Drawing Sheets

US 6,791,733 B2

RESONANCE TYPE OPTICAL MODULATOR USING SYMMETRIC OR ASYMMETRIC ELECTRODE

BACKGROUND OF THE INVENTION

1. Field of the Invention

The present invention relates to the configuration of an optical modulator used in the field of optical communications as a phase modulator, intensity modulator or polarization modulator. It particularly relates to the configuration of a resonance type optical modulator using a symmetric or asymmetric electrode having high modulation efficiency even with a low input voltage.

2. Description of the Prior Art

An optical modulator is a device that converts electrical signal information, such as intensity, phase and frequency, into optical carrier information that is then output. Modulation methods include the direct method in which a source laser is directly modulated, and the method in which the source light wave is modulated by an external modulator. The direct modulation method can be realized with a simple system configuration, while the method using an external modulator provides high-quality modulation. For communications involving very high speeds and long distances, modulation is usually carried out using an external modulator.

The external modulators used include ones that utilize the electro-optical effect or the semiconductor electro-absorption effect. The former relates to the present invention and, as such, is described in further detail below.

$LiNbO_3$, a substance that exhibits the electro-optical effect, is extensively used for optical modulators. The modulation utilizes changes in the refractive index based on the Pockels effect that is the primary electro-optical effect and a characteristic of $LiNbO_3$. It is well known that in the modulation, an electric field is applied parallel or perpendicular to the surface of the $LiNbO_3$ substrate. Which it is depends on the crystal orientation of the $LiNbO_3$ substrate. The field is applied parallel to an x-cut substrate and perpendicular to a z-cut substrate.

Another property of $LiNbO_3$ is that its refractive index can be readily adjusted by thermally diffusing a substance, such as titanium, into the substrate. This is often used to form an optical waveguide in the $LiNbO_3$ substrate and integrate a plurality of the devices.

Modulators that use a $LiNbO_3$ substrate include standing wave type optical modulators and resonance type optical modulators. In a standing wave type optical modulator the optical waves are guided in the same direction as the electric signals, with the light wave being modulated in the waveguides. Such modulators have a wide bandwidth ranging from direct-current signals to microwave signals, but to be effective require a high driving current. On the other hand, since resonance type optical modulators use resonance for the modulation, the bandwidth is limited to a narrow band in the microwave region, but modulation is highly efficient. This makes them effective for applications that require high-efficiency operation in a narrow band, such as polarization scramblers and multiplexers.

The present invention relates to the configuration of this type of resonance type optical modulator, which will therefore now be described in the following. FIGS. 1A and 1B illustrate a prior-art resonance type optical modulator ("Study of 10 GHz resonance type $LiNbO_3$ optical modulator," Oikawa and thee others, Report No. C-3-25, p. 204, of the collected papers of the general conference of the Institute of Electronics, Information and Communication Engineers (2000)). FIG. 1A shows a z-cut type modulator comprised of an optical waveguide, an electrode (modulation electrode) above the optical waveguide and a capacitor for impedance matching. The electrode is of a size that resonates at a microwave frequency input. The modulator shown in FIG. 1B comprises a modulation electrode and an open stub for impedance matching. This modulator is easier to manufacture than the modulator of FIG. 1A.

In the modulator of FIG. 1B, the modulation electrode and the stub are formed of layers of the same metal, which makes the modulator easier to fabricate. However, in addition to being provided on the microwave signal input side, a common level line layer is also provided on the other side of the optical path, and at a position that circumvents the modulation electrode. The configuration therefore has the drawback of being a common electrode while also trying to be a common level structure. Moreover, another drawback is that the effective modulation field strength applied to the optical path is substantially half that compared to when the common level line layer is provided only on the microwave signal input side.

In view of the above shortcomings, the present invention has been proposed, and an object thereof is to provide a resonance type optical modulator using a symmetric or asymmetric electrode that is easy to manufacture and provides highly effective modulation even with a low input voltage, having a configuration that does not give rise to loss of the effective modulation field strength applied to the optical path.

In the description of the invention given below, an open stub means that the end of a microwave asymmetric coplanar waveguide that is not the signal-supply end is open-ended, and a short stub means that the aforementioned end is short-ended.

SUMMARY OF THE INVENTION

The first point of the present invention to attain the above object relates to provide a resonance type optical modulator comprising an optical path having electro-optical effect characteristics, a modulation electrode formed along the optical path for applying an electric field to the optical path, a common electrode formed in opposition to the modulation electrode, a feeding line that is electromagnetically connected to the modulation electrode, and stubs connected to the feeding line; the feeding line, stubs and common electrode being provided on one side of a region that is divided by the modulation electrode.

A coaxial cable is generally used to feed the signal to the modulator from an external signal source, and since the feed has to be made to a very small region while performing impedance matching, the second point of the invention has a feature that the feeding line includes a tapered transformer in addition to the first point.

There can be one stub or a plurality of stubs. When there is a plurality of stubs, the design is facilitated if the stubs are positioned with bilateral symmetry. Therefore, the third point of the present invention relates to a resonance type optical modulator comprising an even number of stubs that are located symmetrically with respect to the feeding line in addition to the first or second point.

In the resonance type optical modulator according to the first point of the present invention, moreover, it is desirable for the stub to be positioned at the junction between the modulation electrode and the feeding line. Therefore the fourth point of the present invention relates to a modulator comprising the modulation electrode and feeding line intersecting at right angles, in addition to the first point, with the stub being located at the junction between the feeding line and the modulation electrode.

Since the resonance type optical modulator according to any one of the first to fourth points of the present invention thus configured can use an open-ended modulation electrode, the fifth point of the present invention relates to a modulator wherein the common electrode formed in opposition to the modulation electrode is open-ended at both ends, in addition to any one of the first to fourth points.

Since the resonance type optical modulator according to any one of the first to fourth points of the present invention thus configured can use a short-ended modulation electrode, the sixth point of the present invention relates to a modulator wherein the common electrode formed in opposition to the modulation electrode is short-ended at both ends, in addition to any one of the first to fourth points.

The stub used can be an open-ended stub or a short-ended stub. Therefore, the seventh point of the present invention relates to a modulator in which the stub is an open-ended stub in addition to any one of the first to sixth points, and the eighth point of the present invention relates to a modulator in which the stub is a short-ended stub.

A resonance type optical modulator having an asymmetric electrode has the following features. The ninth point of the present invention relates to a resonance type having an asymmetric electrode, comprising an optical path having electro-optical effect characteristics, an open stub, a short stub connected to the open stub, a feeder line that is electromagnetically connected to the open stub and the short stub, and a common electrode; the open stub and the short stub being formed on a single optical path and comprising a modulation electrode for applying an electric field to the optical path.

The tenth point of the present invention relates to a modulator including an optical path having electro-optical effect characteristics, a first short stub, a second short stub having a different length from the first short stub that is connected to the first short stub, a feeding line that is electromagnetically connected to the first short stub and the second short stub, and a common electrode; the first short stub and the second short stub being formed on a single optical path and comprising a modulation electrode for applying an electric field to the optical path.

The eleventh point of the present invention relates to a modulator including an optical path having electro-optical effect characteristics, a first open stub, a second open stub having a different length from the first open stub that is connected to the first open stub, a feeding line that is electromagnetically connected to the first open stub and the second open stub, and a common electrode; the first open stub and the second open stub being formed on a single optical path and comprising a modulation electrode for applying an electric field to the optical path.

DESCRIPTION OF THE PREFERRED EMBODIMENTS

Aspects of the embodiments of the present invention are described below with reference to the drawings, starting with a first example 1) of a resonance type optical modulator that uses a symmetric electrode and has an open-ended modulation electrode. This is followed by the description of a second example 2), in which the modulation electrode is short-ended, and a third example 3), in which a longer modulation-electrode is used.

This is followed by descriptions of aspects of embodiments of a resonance type optical modulator that uses an asymmetric electrode. In a fourth example, the invention includes an open stub (meaning that the end of a microwave asymmetric coplanar waveguide that is not the signal-supply end is open-ended) and a short stub (the end that is not the signal-supply end is short-ended). A fifth example includes a first open stub, and a second open stub having a different length from the first open stub that is connected to that waveguide. A sixth example includes a first short stub, and a second short stub having a different length from the first short stub that is connected to that waveguide.

EXAMPLE 1

Figure 2A:
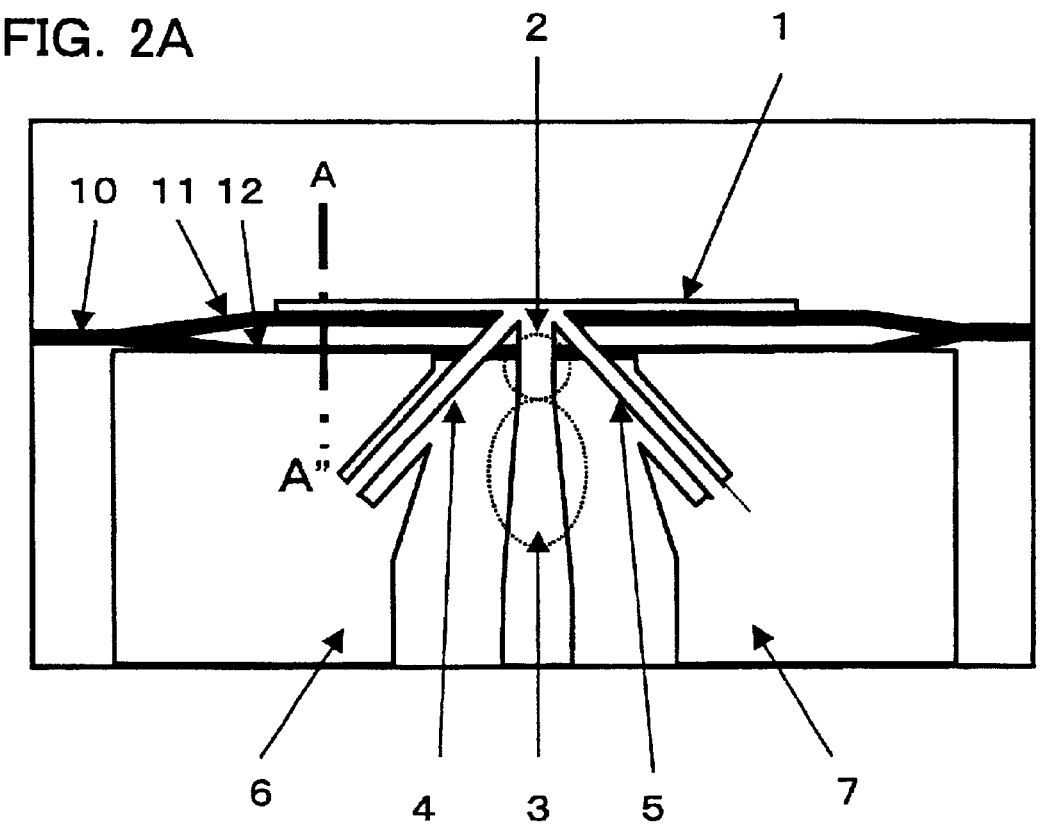
FIG. 2A is a plan view of a resonance type optical modulator with an open-ended modulation electrode.
Figure 2B:
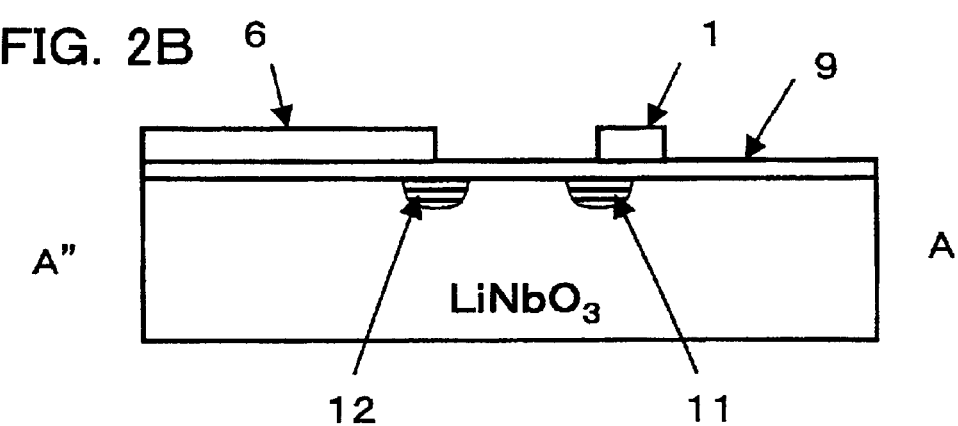
FIG. 2B is a cross-sectional view of the resonance type optical modulator with the open-ended modulation electrode.

FIGS. 2A and 2B are plan and cross-sectional views, respectively, of a resonance type optical modulator comprising a modulation electrode formed on an optical path for applying an electric field to the optical path, and a common electrode formed in opposition to the modulation electrode, in which the modulation electrode comprises an open-ended, microwave asymmetric coplanar waveguide. The resonance type modulator shown is a Mach-Zehnder interferometer type optical modulator used for intensity-modulating a light wave having a wavelength of 1.55 microns, using a microwave signal having a center frequency of 10 GHz. The modulator has a z-cut $LiNbO_3$ substrate in which an optical path 10, 11, 12 is formed by thermally diffusing Ti (titanium) into the substrate. To suppress the attenuation of the light propagating in the optical waveguide, a layer 9 of silicon oxide having a thickness of 0.55 $\mu$m is formed on the substrate. A metal layer (gold, a thickness of 2 $\mu$m) is provided on the layer 9 to form thereon a modulation electrode, a transformer, stubs and a common electrode.

The modulation electrode 1 is 5 $\mu$m wide and 3250 $\mu$m long, and is separated from common electrodes 6 and 7 by a distance of 27 $\mu$m. The length of the modulation electrode 1 is 0.19 times the wavelength of the microwave modulation signal, and can be set to 0.18 to 0.22 (or 0.67 to 0.70) times the wavelength. To ensure that the combined impedance of stub and electrode stays in an appropriate region, the modulation electrode 1 should be 20 to 25% shorter relative to the resonance point of the microwave modulation signal.

Short stubs 4 and 5 are each 50 $\mu$m wide and 875 $\mu$m long, and are separated from the common electrodes 6 and 7 by a distance of 27 $\mu$m. The length of the stubs is 0.12 times the wavelength of the microwave modulation signal. The junction between the short stubs 4 and 5 and the modulation electrode 1 is roughly at the middle of the modulation electrode 1. The stubs are provided at a slant to the modulation electrode 1. The feeding line is connected to the junction portion. In FIG. 2A the connection is shown as a direct-current type connection effected by means of a continuous conductor. However, the connection is not limited to a direct-current connection, and may be any connection that attains the purpose, such as an electromagnetic connection based on capacitor or inductor. The feeding line includes a feeding line connection and a tapered transformer. In FIG. 2, there is a 100-$\mu$m feeding line connection between the junction and the tapered transformer. The short stubs 4 and 5 can be provided anywhere along the feeding line connection without any particular problem. There is no essential reason to provide a wiring line, which can be omitted. The tapered transformer is to ensure the incoming signal from the input end of the coplanar waveguide is supplied to the short stubs without being reflected back. The tapered transformer is 800 $\mu$m long and tapers from a width of 100 $\mu$m to a width of 35 $\mu$m, with the distance from the common electrode tapering from 325 $\mu$m to 107.5 $\mu$m. The short stubs are provided to prevent excessive reduction in the input impedance of the modulation electrode in a certain frequency range, and are particularly effective in preventing excessive reduction in the impedance during resonance. The short stubs have to be adjusted to maximize phase change effect (the induced phase amount) of the microwave signal input.

Figure 3:
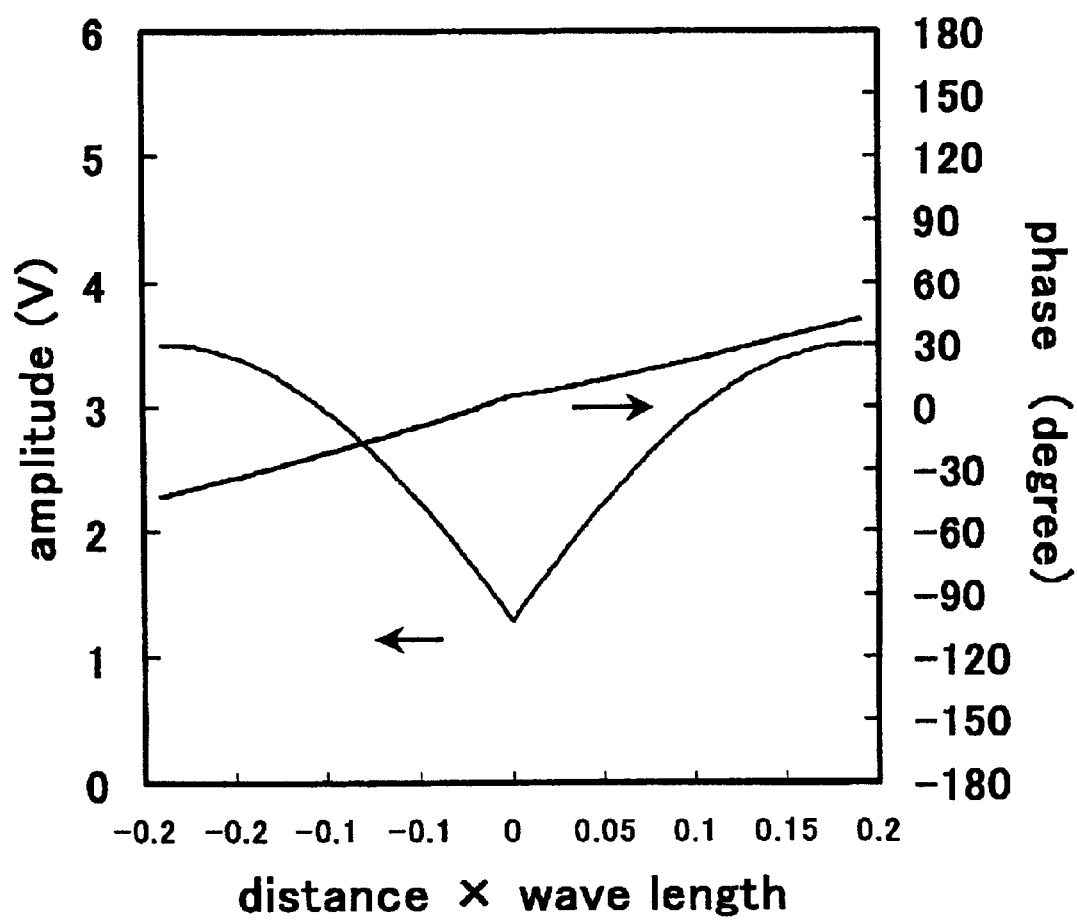
FIG. 3 shows the result of a computer simulation relating to the field strength and phase of an electric signal on the modulating electrode of a Mach-Zehnder interferometer type resonance type optical modulator used for intensity-modulating a light wave having a wavelength of 1.55 microns with a microwave having a center frequency of 10 GHz, shown with respect to the coordinate system moving along with the light wave propagating in the waveguide.
Figure 4:
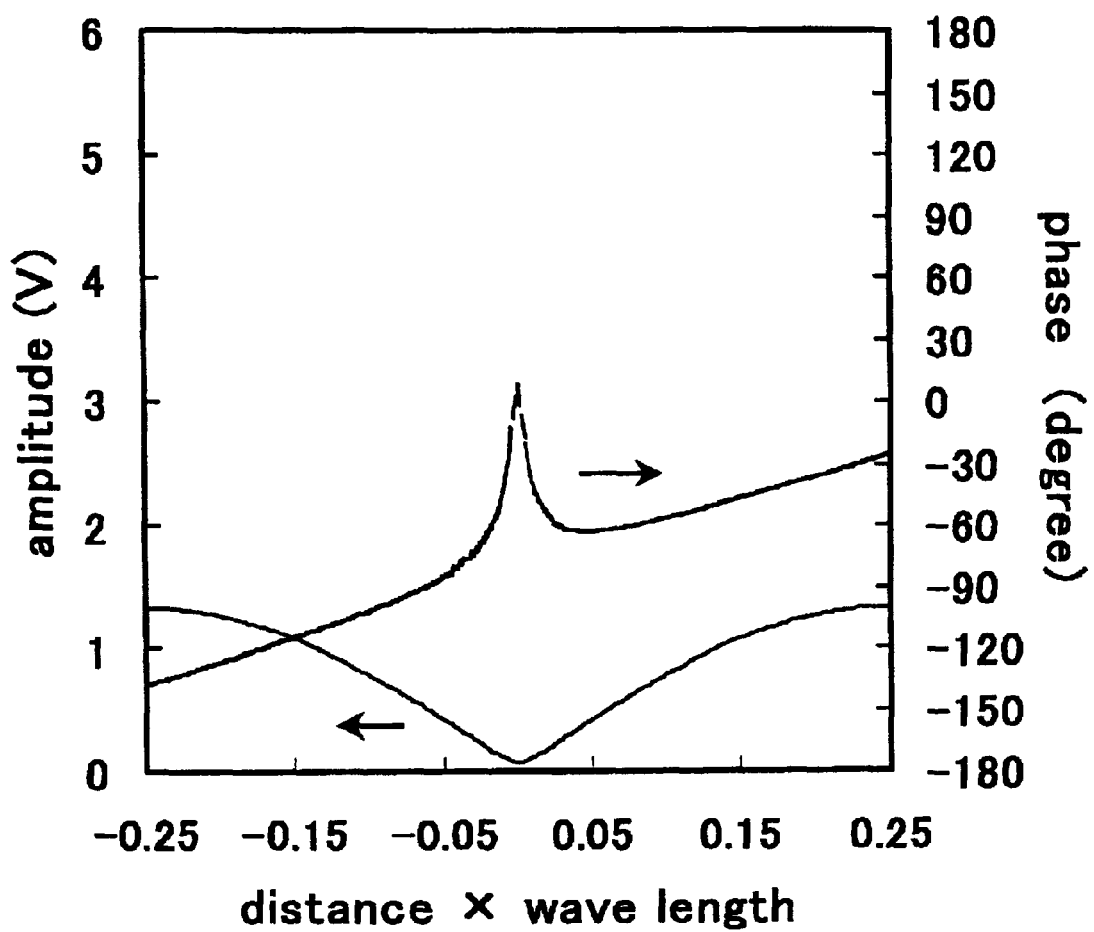
FIG. 4 shows the result of a computer simulation relating to the field strength and phase of an electric signal on the modulating electrode of a Mach-Zehnder interferometer type resonance type optical modulator used for intensity-modulating a light wave having a wavelength of 1.55 microns with a microwave having a center frequency of 10 GHz, using a modulation electrode having a length that is 0.5 times the wavelength of the microwave, shown with respect to the coordinate system moving along with the light wave propagating in the waveguide.
Figure 5:
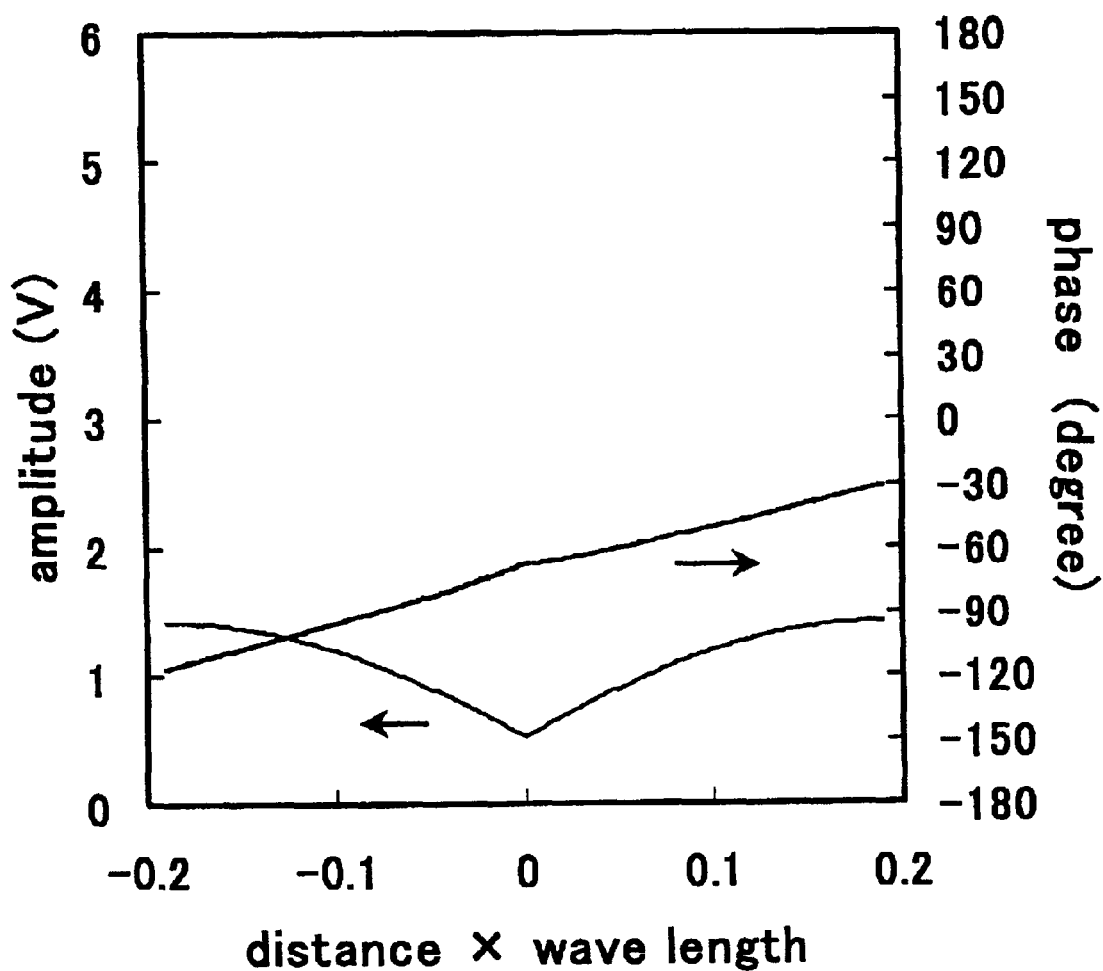
FIG. 5 shows the result of a computer simulation relating to the field strength and phase of an electric signal on the modulating electrode of a Mach-Zehnder interferometer type resonance type optical modulator used for intensity-modulating a light wave having a wavelength of 1.55 microns with a microwave having a center frequency of 10 GHz, when no stub is used, shown with respect to the coordinate system moving along with the light wave propagating in the waveguide.

FIG. 3 shows the result of a computer simulation relating to the field strength and phase of light propagating in a waveguide along the modulation electrode of a Mach-Zehnder interferometer type resonance type optical modulator used for intensity-modulating a light wave having a wavelength of 1.55 microns with a microwave signal having a center frequency of 10 GHz, shown with respect to the coordinate system moving along with the light wave propagating in the waveguide. The field strength is shown in the figure as the normalized amplitude of the input microwave signal; as shown, the field strength increases. With respect to the coordinate system moving along with the light wave propagating in the waveguide, the phase increases from left to right. FIG. 4 shows the result of a computer simulation with no optimization (specifically, in which the length of the modulation electrode is 0.5 times the wavelength of the microwave signal). As can readily be understood from a comparison of FIGS. 3 and 4, optimization results in an increased potential on the modulation electrode. FIG. 5 shows the result of a computer simulation when no stub is used (with conditions other than the stubs being the same as those producing the result shown in FIG. 3). As can readily be understood from a comparison of FIGS. 3 and 5, stub usage results in an increased potential on the modulation electrode.

Although in the configuration shown in FIG. 2, two short stubs are used, the same effect can be obtained using one short stub, provided that the one short stub is made 1.42 times longer than the above stub length when two stubs are used.

EXAMPLE 2

Figure 6A:
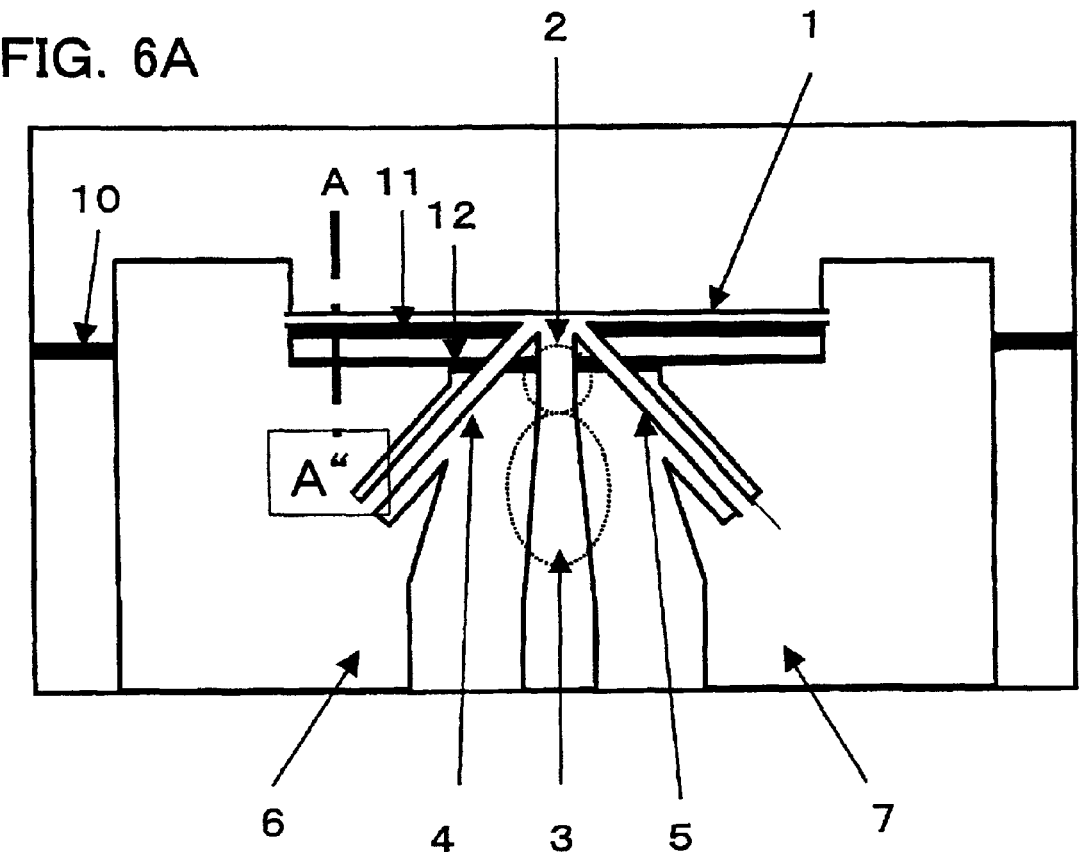
FIG. 6A is a plan view of a resonance type optical modulator with a short-ended modulation electrode.
Figure 6B:
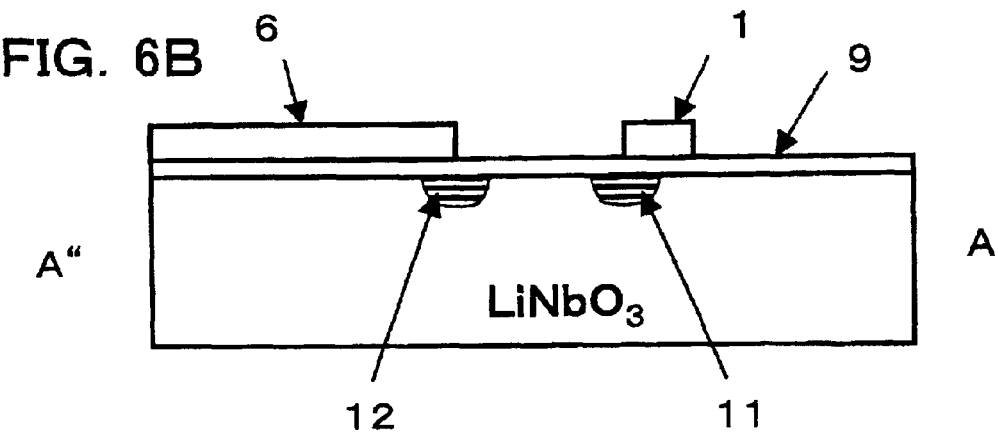
FIG. 6B is a cross-sectional view of the resonance type optical modulator with the short-ended modulation electrode.

FIGS. 6A and 6B are plan and cross-sectional views, respectively, of a second example of a resonance type optical modulator in which the modulation electrode comprises a short-ended, microwave asymmetric coplanar waveguide. As in the case of the first example, the resonance type modulator is a Mach-Zehnder interferometer type optical modulator used for intensity-modulating a light wave having a wavelength of 1.55 microns, using a microwave signal having a center frequency of 10 GHz. The substrate and sectional structures are the same as those of the first example, and so further explanation thereof is omitted.

Both ends of modulation electrode 1 are connected to the common electrode. The modulation electrode is 5 pm wide and 7010 pm long, and is separated from the common electrodes 6 and 7 by a distance of 27 pm. The electrode length is set to be 0.41 times the wavelength of the microwave modulation signal, and can be set to be from 0.41 to 0.44 (or 0.91 to 0.94) times the wavelength. To ensure that the combined impedance of stub and electrode stays in an appropriate region, the modulation electrode 1 should have a length that is 15 to 20% offset on the shorter wavelength side relative to the resonance point of the microwave signal.

Short stubs 4 and 5 are each 50 $\mu$m wide and 1165 $\mu$m long and are separated from the common electrodes 6 and 7 by a distance of 27 $\mu$m. The length of the stubs is 0.16 times the wavelength of the microwave modulation signal. The junction between the short stubs 4 and 5 and the modulation electrode 1 is roughly at the middle of the modulation electrode. The stubs are provided at a slant to the electrode 1. A 100-$\mu$m feeding line connection is provided between the junction and the tapered transformer. There is no essential reason for providing the wiring line, which can be omitted. The short stubs have to be adjusted to maximize the phase change effect (the induced phase amount) of the microwave electrical signal input.

With respect to the lengths of open-ended and short-ended modulation electrodes, while the length of an open-ended modulation electrode is roughly half the wavelength of the microwave signal propagating on the electrode, a short-ended modulation electrode is roughly one wavelength long. This enables a selection to be made according to the length of the modulation electrode it is desired to use.

EXAMPLE 3

Figure 7:
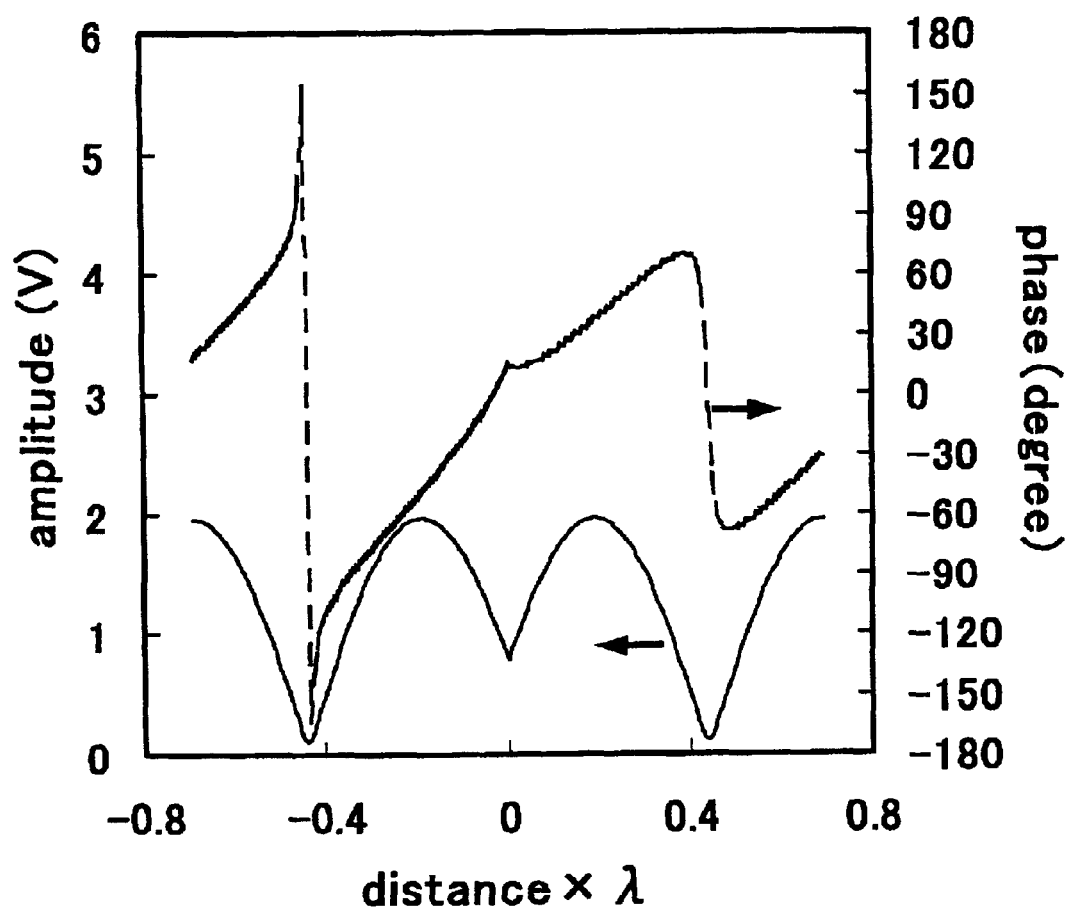
FIG. 7 shows the result of a computer simulation relating to the field strength and phase of an electric signal on the modulating electrode of a Mach-Zehnder interferometer type optical modulator used for intensity modulating a light wave having a wavelength of 1.55 microns with a microwave having a center frequency of 10 GHz, using modulation electrode having a length that is 0.69 times the wavelength of the microwave, shown with respect to the coordinate system moving along with the light wave propagating in the waveguide.

FIG. 7 shows the result of a computer simulation relating to the field strength and phase of a light wave propagating in a waveguide along the modulation electrode of a Mach-Zehnder interferometer type resonance type optical modulator used for intensity-modulating a light wave having a wavelength of 1.55 microns with a microwave signal having a center frequency of 10 GHz, with the length of the modulation electrode being 0.69 times the wavelength of the microwave signal, shown with respect to the coordinate system moving along with the light wave propagating in the waveguide. This shows that in the vicinity of −0.4$\lambda$ along the horizontal axis, the field phase undergoes a reversal of more than 180 degrees. At the place this happens, it can be seen that the phase change effect of the microwave electrical signal input (the induced phase amount) is the reverse of that in other portions.

This gives rise to a decrease in the sum amount of induced phase. To prevent this decrease, in areas where the phase exceeds 180 degrees, it is desirable either to increase the distance between the modulation electrode and the light path, or to reverse the direction of substrate polarization. When the distance is sufficiently large, the induced phase does not increase. But, when the polalization is reversed, there is an increase in the above-described decrease at that portion. The polarization can be reversed by applying a direct-current high-voltage in the order of 20 to 25 kV/mm, using the method described by, for example, H. Murata, K. Kinoshita, G. Miyaji, A. Morimoto and K. Kobayashi in "Quasi-velocity-matched LiTaO$_3$ guided wave optical phase modulator for integrated ultrashort optical pulse generators", Electronic Letters 17th August 2000, vol. 36, No. 17, 1459–1460. This completes the description of the third example.

Figure 8:
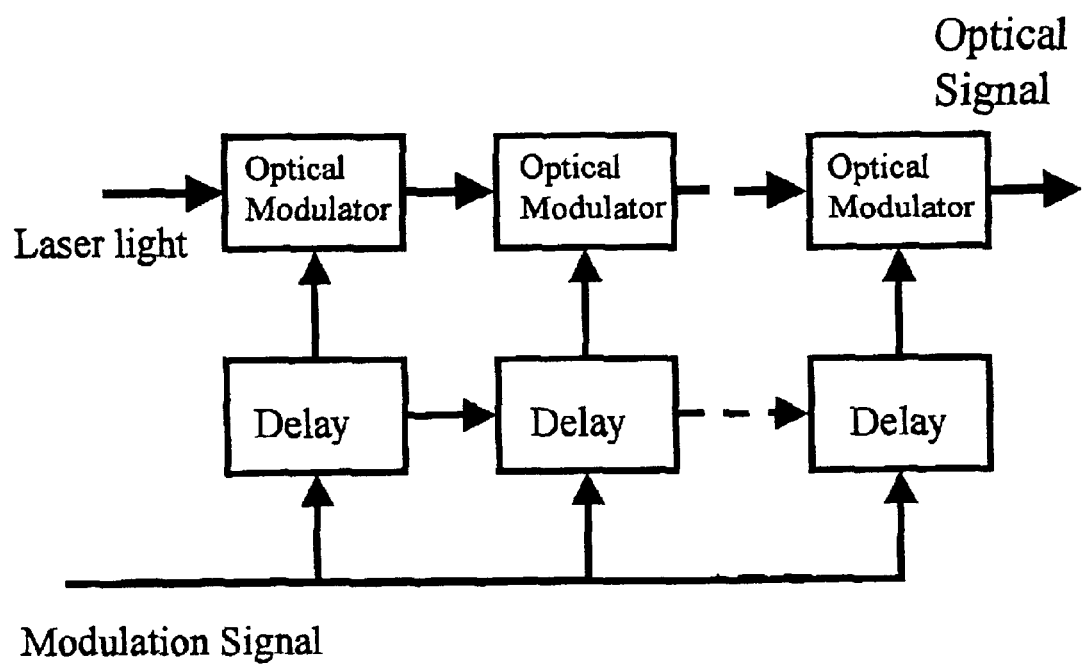
FIG. 8 is a block diagram of a configuration in which plural modulators are connected in series.

Any of the modulators described in the foregoing can be linked in series, as shown in FIG. 8, to strengthen the modulating effect. In such a configuration, delay circuits are used to align the microwave modulation signal with the propagating light wave.

Figure 1A:
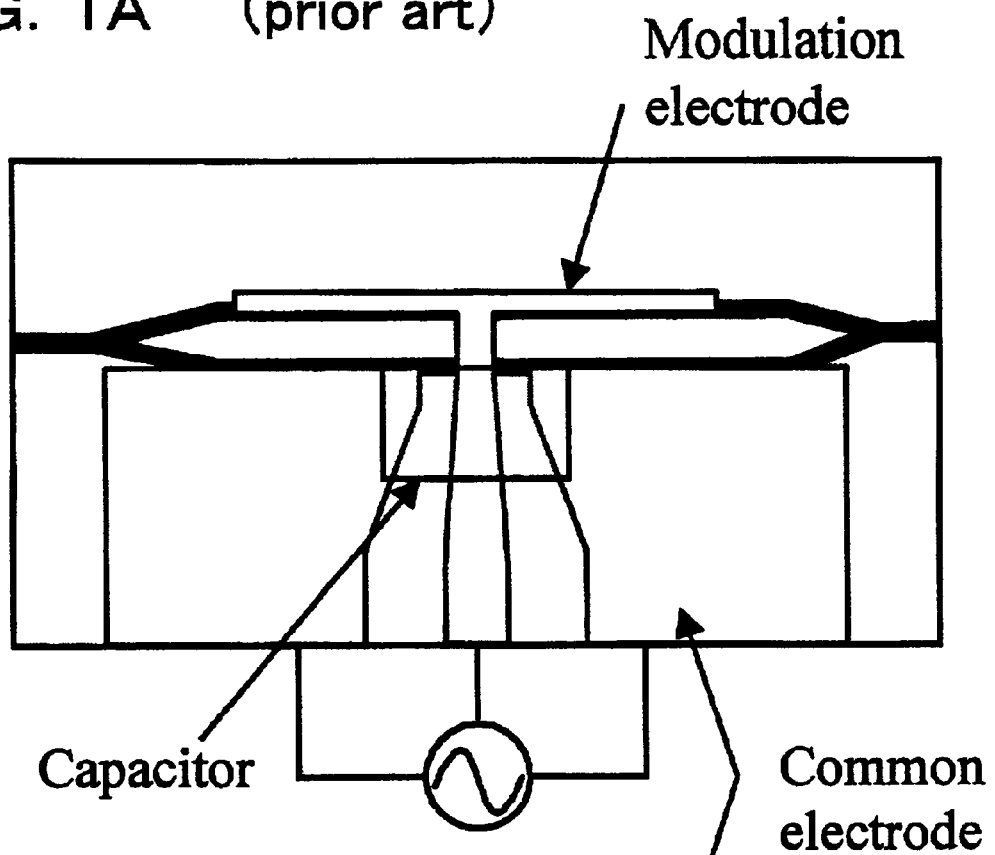
FIG. 1A shows a resonance type optical modulator of the prior art, comprising an optical waveguide, an electrode (modulation electrode) located above the optical waveguide and a capacitor for impedance matching.
Figure 1B:
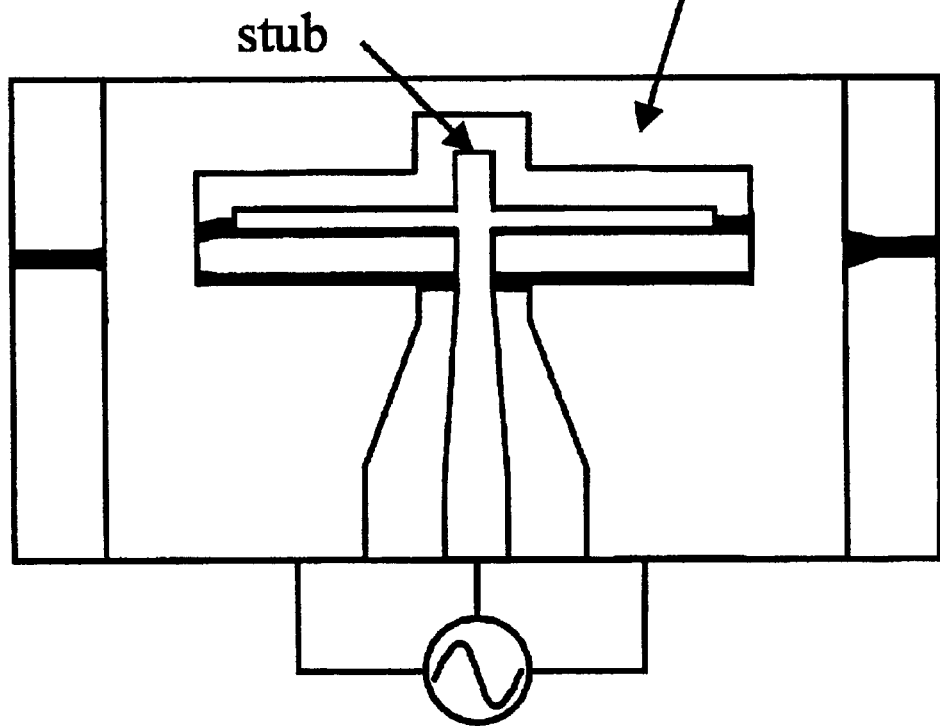
FIG. 1B shows a resonance type optical modulator of the prior art, comprising a modulation electrode and an open stub for impedance matching.
Figure 9A:
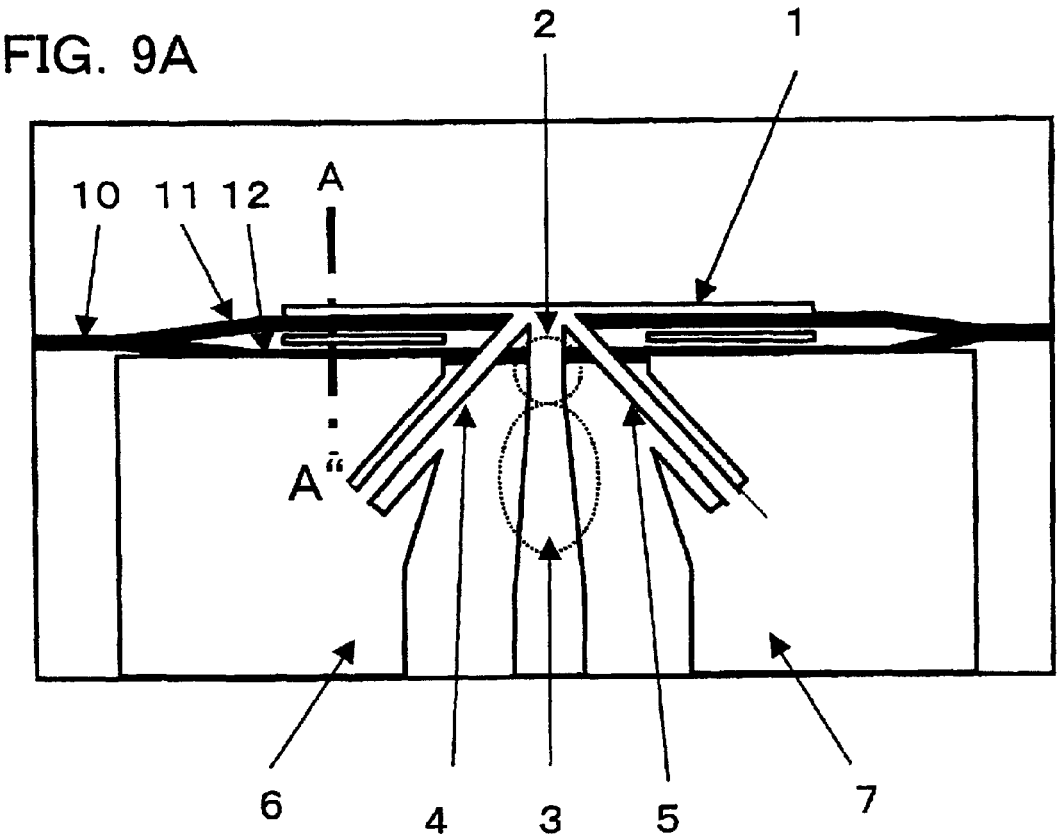
FIG. 9A is a plan view of a modulator in which the modulation electrode is an asymmetric ICPW (Interdigital Coplanar Waveguide).
Figure 9B:
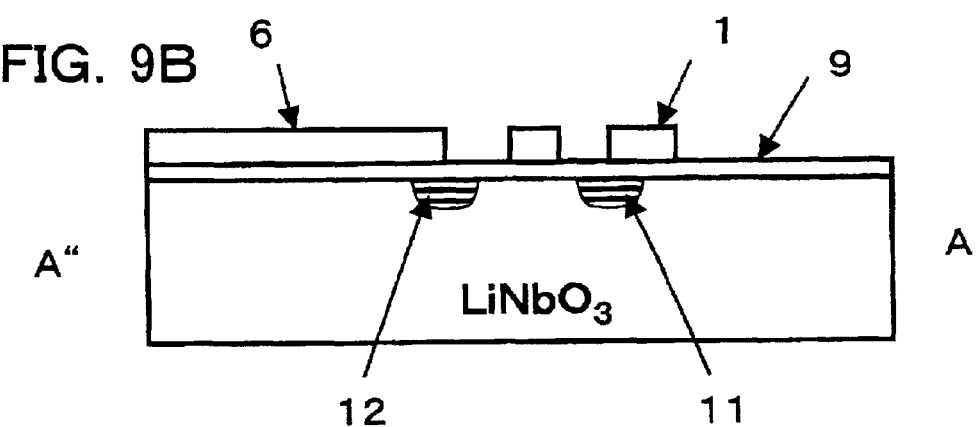
FIG. 9B is a cross-sectional view of the modulator in which the modulation electrode is an asymmetric ICPW (Interdigital Coplanar Waveguide).

The foregoing description has been made with reference to a configuration in which the modulating and common electrodes are directly opposed. However, the object of the present invention can also be attained using a conventional ICPW (interdigital coplanar waveguide) comprised by interposing an electrical conductor therebetween to provide a state equivalent to signal isolation. A waveguide having a conductor thus disposed is described in FIG. 1 of a report by David A. Thompson and Robert L. Rogers in IEEE Microwave and Guided Wave Letters, vol. 8, No. 7, July 1998, pp. 257–259. The present invention uses the asymmetric ICPW shown in FIG. 9, that is, on one side the common electrode is omitted.

The above embodiments have been described with reference to an intensity modulator. However, since these intensity modulators have the same type of configuration as a polarization modulator that employs the electro-optical effect, it can be understood that the present invention can also be applied to a polarization modulator. It is also clear that the present invention can also be applied to a phase modulator that uses the electro-optical effect, since modulation is applied to just the light path with the modulation electrode.

EXAMPLE 4

Figure 10A:
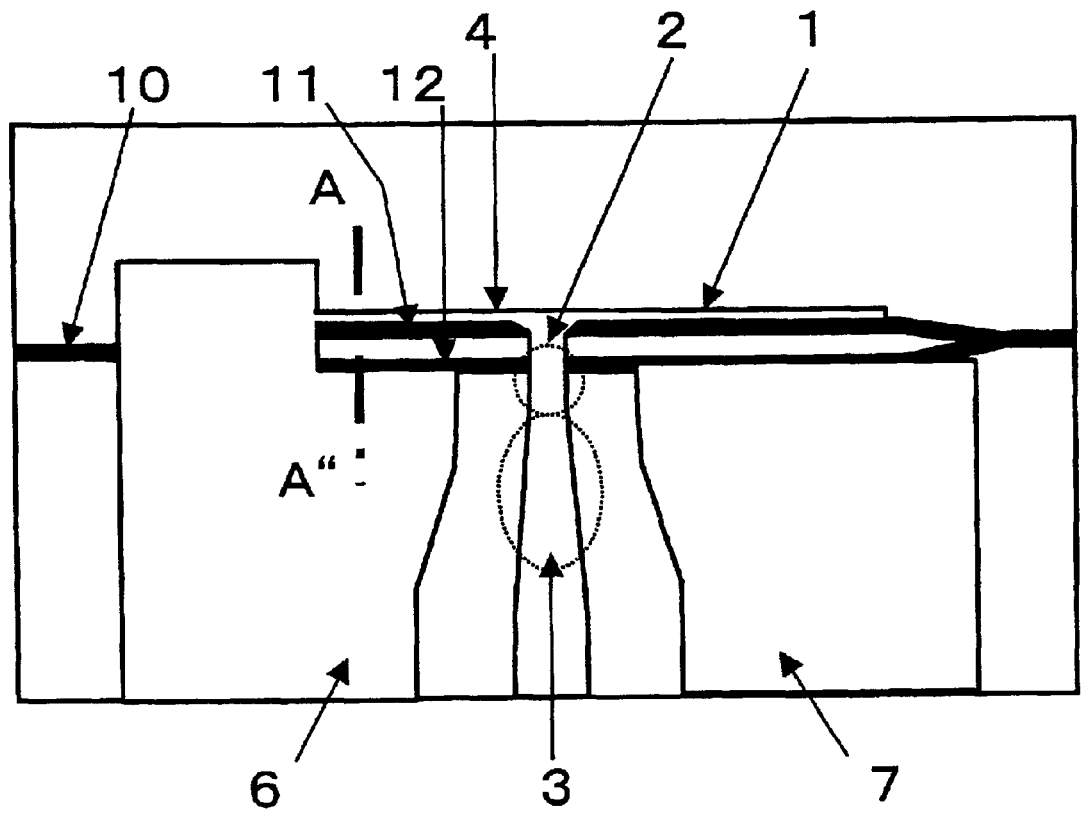
FIG. 10A is a plan view of a resonance type optical modulator in which the modulation electrode is composed of an open stub and a short stub.
Figure 10B:
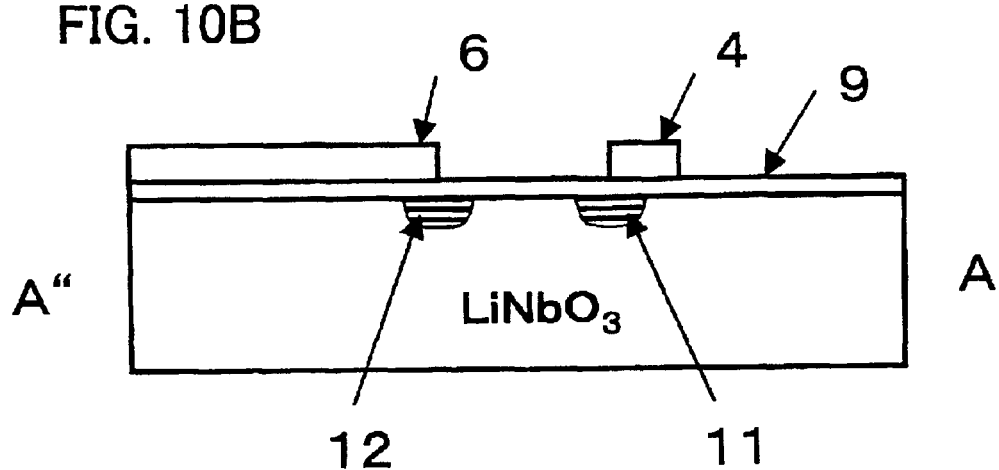
FIG. 10B is a cross-sectional view of the resonance type optical modulator in which the modulation electrode is composed of an open stub and a short stub.

FIGS. 10A and 10B are plan and cross-sectional views, respectively, of a resonance type optical modulator in which the modulation electrode is composed of an open stub and a short stub. The resonance type modulator shown is a Mach-Zehnder interferometer type optical modulator used for intensity-modulating a light wave having a wavelength of 1.55 microns, using a microwave signal having a center frequency of 10 GHz. The modulator has a z-cut LiNbO$_3$ substrate in which an optical path is formed by thermally diffusing Ti (titanium) into the substrate. To suppress the attenuation of the light propagating in the optical waveguide, a layer 9 of silicon oxide having a thickness of 0.55 μm is formed on the substrate. A metal layer having a thickness of 2 μm is provided on the layer 9 to form thereon a modulation electrode, a transformer, stubs and a common electrode.

The modulation electrode is comprised of an open stub 1 along an optical waveguide, and a short stub 4 along the same waveguide. The open stub 1 is 5 μm wide and 1881 μm long (including half the width of the wiring line), and is separated from common electrode 7 by a distance of 27 μm. This stub length is 0.22 times the wavelength of the microwave modulation signal propagating on the waveguide, and can be set to 0.20 to 0.24 (or 0.70 to 0.74) times the wavelength. The short stub 4 is 5 μm wide and 256 μm long (including half the width of the wiring line), and is separated from common electrode 6 by a distance of 27 μm. This stub length is 0.03 times the wavelength of the microwave modulation signal propagating on the waveguide. The electrical feed takes place at the junction between the stubs. In FIG. 10A the connection is shown as a direct-current type connection effected by means of a continuous conductor. However, the connection is not limited to a direct-current connection, and may be any connection that attains the purpose, such as an electromagnetic connection based on capacitor or inductor. There is a 100-μm feeding line connection between the junction and a tapered transformer. The stubs 4 and 5 can be provided anywhere along the feeding line connection without any particular problem. There is no essential reason to provide a wiring line other than to effect a connection, and the line can be omitted. The tapered transformer is to ensure that the incoming signal from the input end of the coplanar waveguide is supplied to the stubs 1 and 4 without being reflected back. The tapered transformer is 800 μm long and tapers from a width of 100 μm to a width of 35 μm, with the distance from the common electrode tapering from 325 μm to 107.5 μm.

An advantage of this configuration is that, since the modulation electrode is connected to the common electrode by a stub, it is not susceptible to interference caused by electrostatic charges and low-frequency signals.

Figure 11:
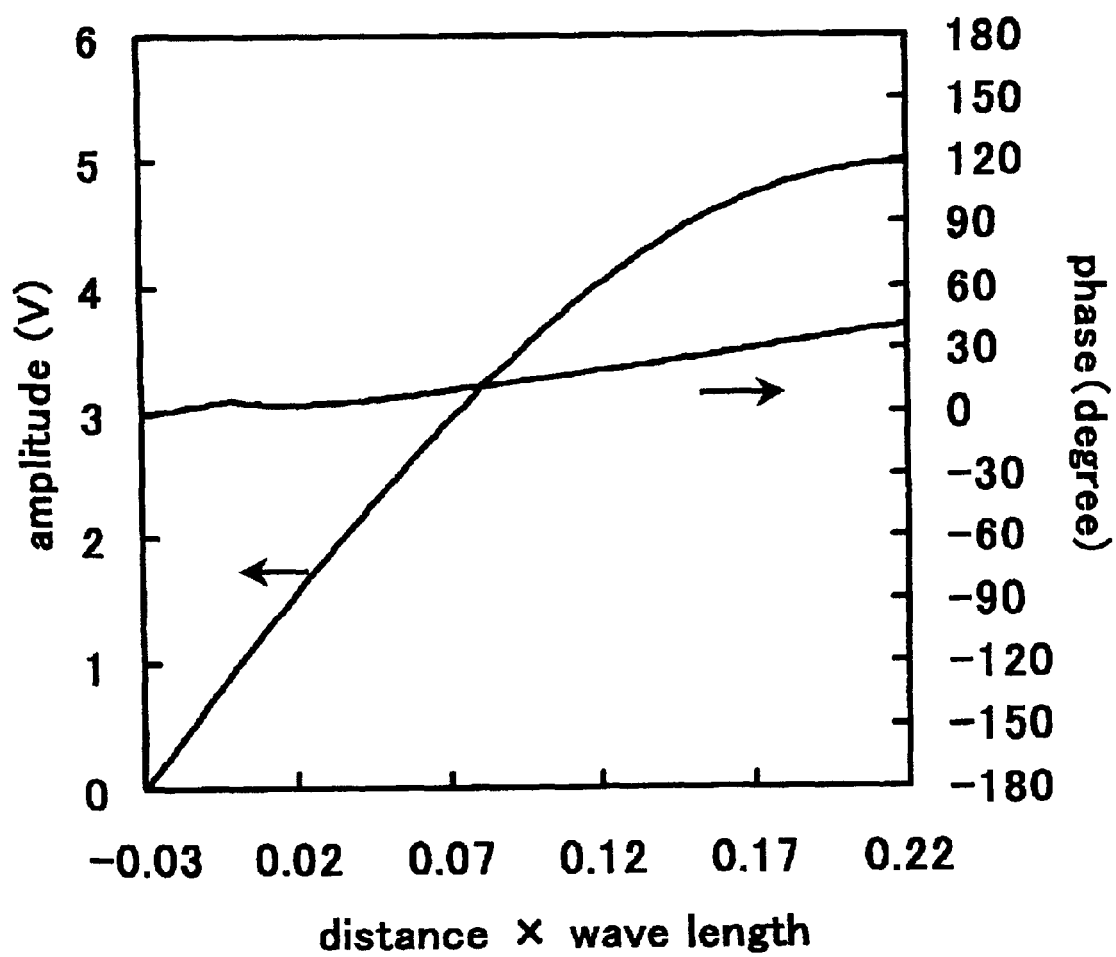
FIG. 11 shows the result of a computer simulation relating to the field strength (solid line) and phase (dotted line) of an electric signal on the modulating electrode, shown with respect to the coordinate system moving along with the light wave propagating in the waveguide.
Figure 12:
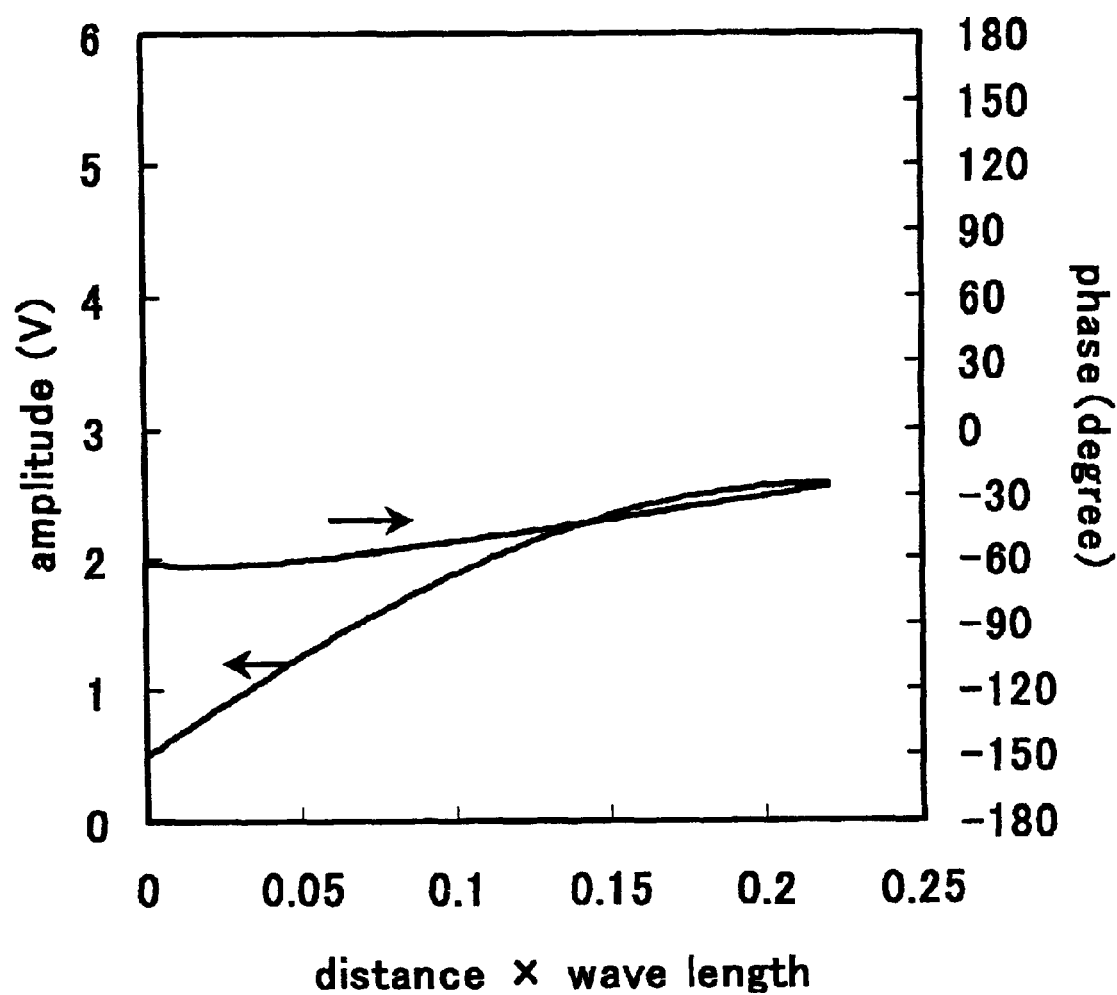
FIG. 12 shows the result of a reference simulation.
Figure 13:
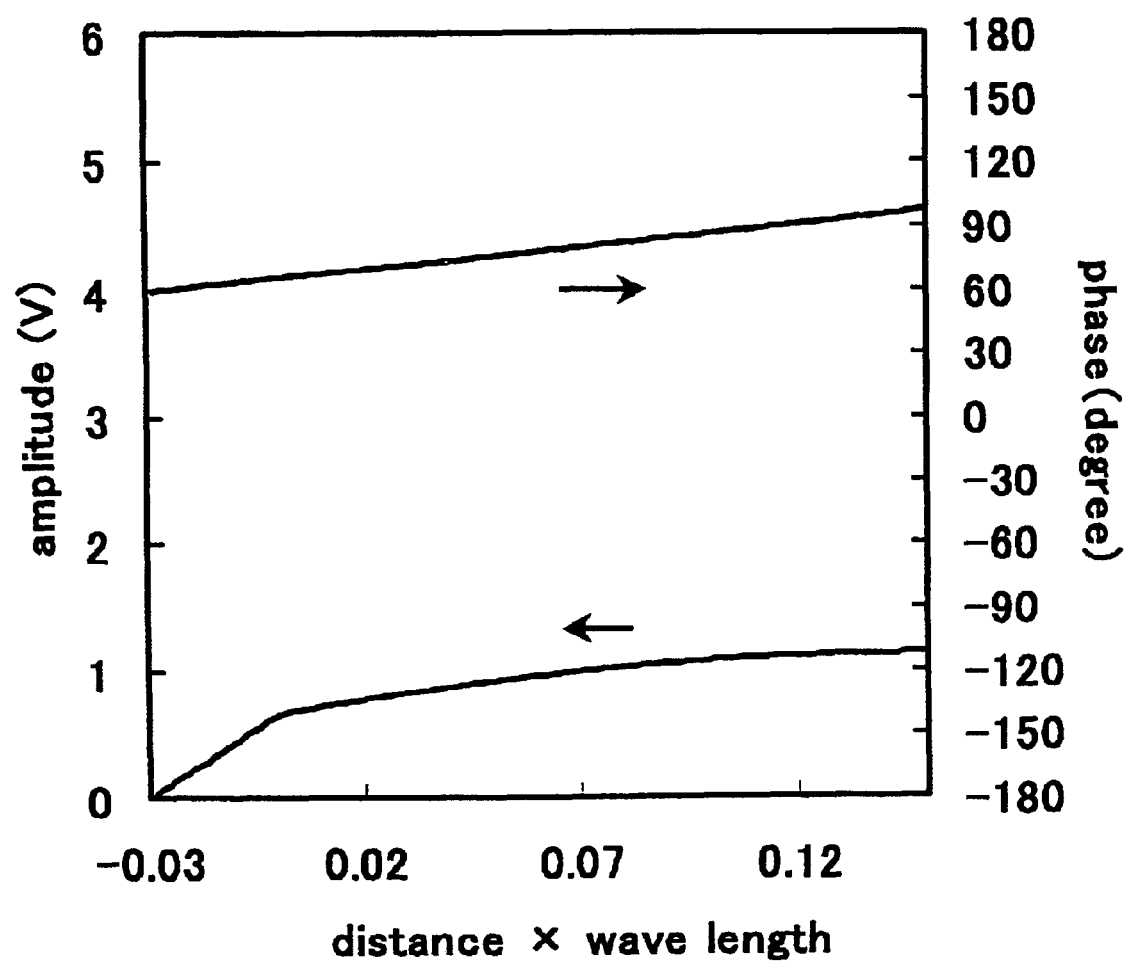
FIG. 13 shows the result of a computer simulation of a non-optimized configuration in which the modulation electrode is composed of an open stub 1 and a short stub 4 on the optical waveguide.

FIG. 11 shows the result of a computer simulation relating to the field strength (solid line) and phase (dotted line) of light propagating in a waveguide along the modulation electrode of the above Mach-Zehnder interferometer type resonance type optical modulator used for intensity-modulating a light wave having a wavelength of 1.55 microns with a microwave signal having a center frequency of 10 GHz, shown with respect to the coordinate system moving along with the light wave propagating in the waveguide. FIG. 12 shows the result of a reference simulation made using no short stub 4. The field strength is shown as the normalized amplitude of the input microwave signal. A comparison of the two figures shows that the field strength is increased by the use of the short stub 4. As viewed with respect to the coordinate system moving along with the light wave propagating in the waveguide, the phase increases from left to right. FIG. 13 shows the result of a computer simulation using no optimization; that is, one in which the length of the modulation electrode (the combined length of the stubs 1 and 4) is 0.18 times the wavelength of the microwave signal propagating on the electrode. As can readily be seen from a comparison of FIGS. 11 and 13, optimization increases the potential on the modulation electrode.

The above embodiments have been described with reference to an intensity modulator. However, since these intensity modulators have the same type of configuration as a polarization modulator that employs the electro-optical effect, it is to be understood that the present invention can also be applied to a polarization modulator. It is also clear that the present invention can also be applied to a phase modulator that uses the electro-optical effect, since modulation is applied to just the light path with the modulation electrode.

While the above configuration can be achieved with an x-cut type modulator, since there are different distances between the modulation electrode and common electrodes from the z-cut type described above, the size of the stubs has to be adjusted accordingly to maximize the phase change effect (the induced phase amount) of the microwave electrical signal input.

EXAMPLE 5

Figure 14A:
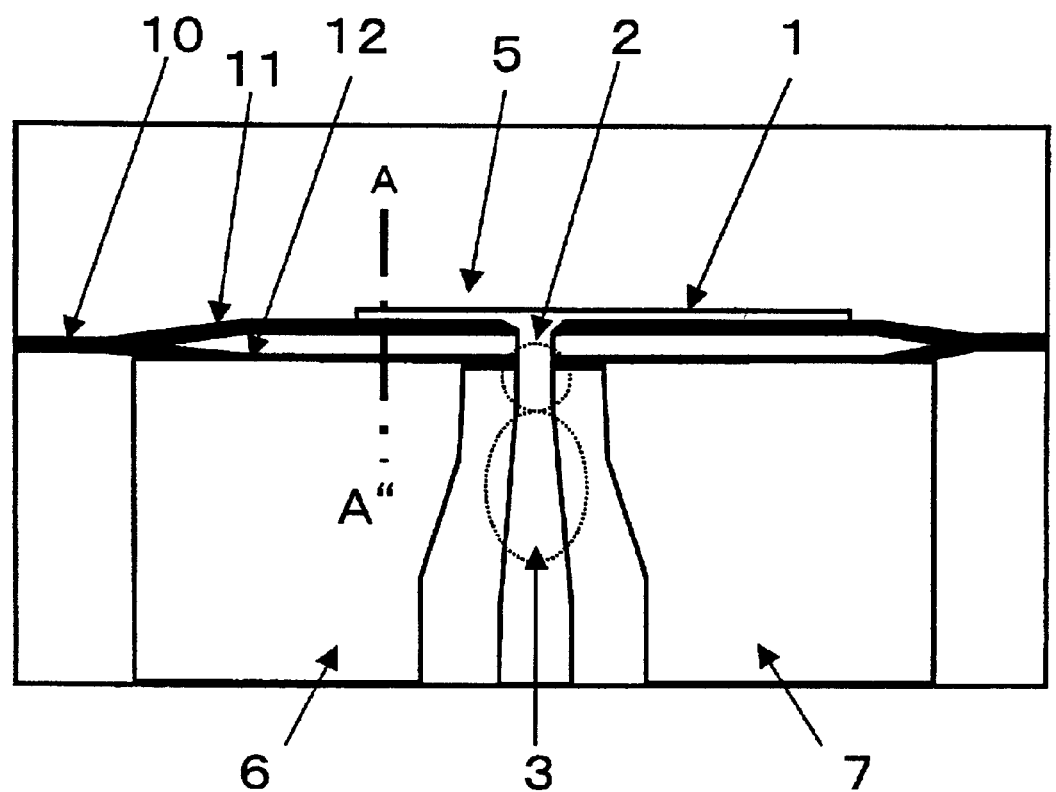
FIG. 14A is a plan view of a resonance type optical modulator in which the modulation electrode is composed of an open stub 1 and an open stub 5 on the optical waveguide.
Figure 14B:
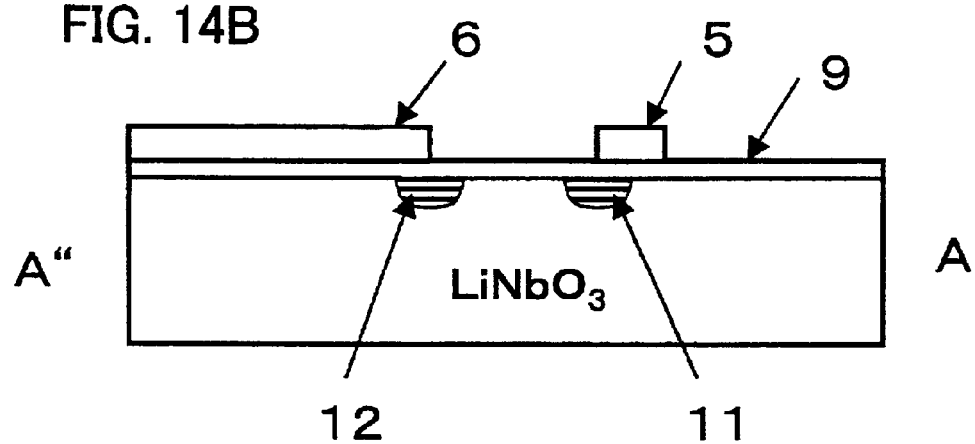
FIG. 14B is a cross-sectional view of the resonance type optical modulator in which the modulation electrode is composed of the open stub 1 and open stub 5 on the optical waveguide.

FIGS. 14A and 14B are plan and cross-sectional views, respectively, of a resonance type optical modulator in which the modulation electrode is comprised of first and second open stubs having different lengths, disposed on the same waveguide. As in the above examples, the resonance type modulator shown is a Mach-Zehnder interferometer type optical modulator used for intensity-modulating a light wave having a wavelength of 1.55 microns, using a microwave signal having a center frequency of 10 GHz. Since the substrate and sectional structures are the same as those of the first example, further explanation thereof is omitted.

As described, the modulation electrode is comprised of an open stub 1 on an optical waveguide, and an open stub 5 on the same waveguide. The open stub 1 is 5 μm wide and 1710 μm long (including half the width of the wiring line), and is separated from common electrode 7 by a distance of 27 μm. This stub length is 0.2 times the wavelength of the microwave modulation signal propagating on the waveguide, and can be set to 0.18 to 0.22 (or 0.68 to 0.72) times the wavelength. The open stub 5 is 5 μm wide and 2564 μm long (including half the width of the wiring line), and is separated from common electrode 7 by a distance of 27 μm. This stub length is 0.3 times the wavelength of the microwave modulation signal propagating on the waveguide. As shown in FIG. 14, the electrical feed takes place at the junction between the two stubs. There is a 100-μm feeding line connection provided between the junction and a tapered transformer. There is no essential reason to provide this wiring line, which can be omitted. The tapered transformer is to ensure that the incoming signal from the input end of the coplanar waveguide is supplied to the open stubs 1 and 5 without being reflected back. The tapered transformer is 800 μm long and tapers from a width of 100 μm to a width of 35 μm, with the distance from the common electrode tapering from 325 μm to 107.5 μm.

An advantage of this configuration is that it enables a direct-current bias and low-frequency signals to be applied to the modulation electrode.

Figure 15:
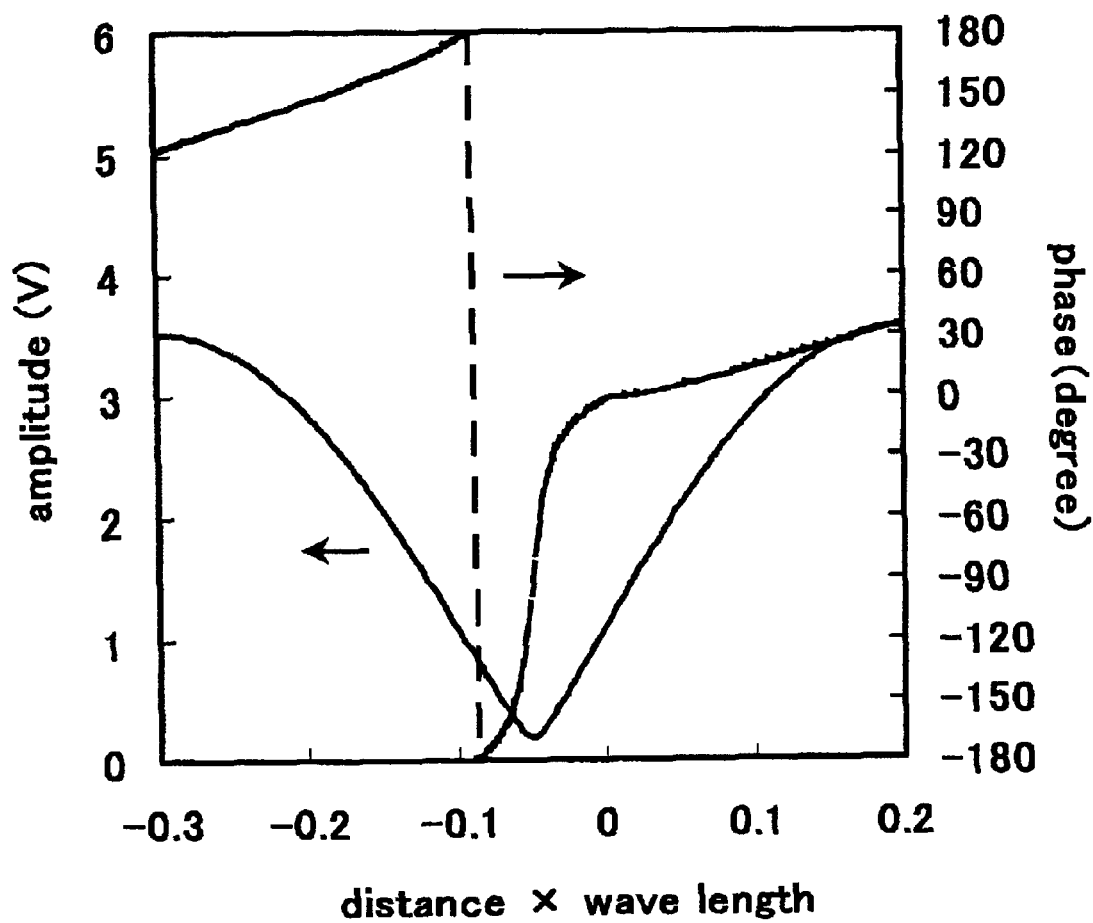
FIG. 15 shows the result of a computer simulation relating to the field strength (solid line) and phase (dotted line) of an electric signal on the modulating electrode in an optical waveguide composed of the open stubs 1 and 5, shown with respect to the coordinate system moving along with the light wave propagating in the waveguide.

FIG. 15 shows the result of a computer simulation relating to the field strength (solid line) and phase (dotted line) of a lightwave propagating in a waveguide along the modulation electrode of a thus-configured Mach-Zebnder interferometer type resonance type optical modulator used for intensitiy-modulating a light wave having a wavelength of 1.55 microns with a microwave signal having a center frequency of 10 GHz, shown with respect to the coordinate system moving along with the light wave propagating in the waveguide. The field strength is shown as the normalized amplitude of the input microwave signal. A comparison with the FIG. 12 result obtained using no stub shows higher field strength. Also, with respect to the coordinate system moving along with the light wave propagating in the waveguide, there is a phase increase from left to right. At a distance of 427 pm from the junction between the open stubs 1 and 5, that is, at a distance that is 0.05 times the wavelength, the phase exceeds 180 degrees, showing that at that portion, the phase change effect of the input microwave electrical signal (the induced phase amount) is reversed.

This gives rise to a decrease in the sum amount of induced phase. To prevent this decrease, in areas where the phase exceeds 180 degrees, it is desirable either to increase the distance between the modulation electrode and the light path, or to reverse the direction of substrate polarization. When the distance is increased, the induced phase does not increase, but there is an increase in the above-described decrease at that portion. The polarization can be reversed by applying a direct-current high-voltage in the order of 20 to 25 kV/mm, using the method described by, for example, H. Murata, K. Kinoshita, G. Miyaji, A. Morimoto and K. Kobayashi in "Quasi-velocity-matched LiTaO$_3$ guided wave optical phase modulator for integrated ultrashort optical pulse generators", Electronic Letters 17th August 2000, vol. 36, No. 17, 1459–1460.

Figure 16:
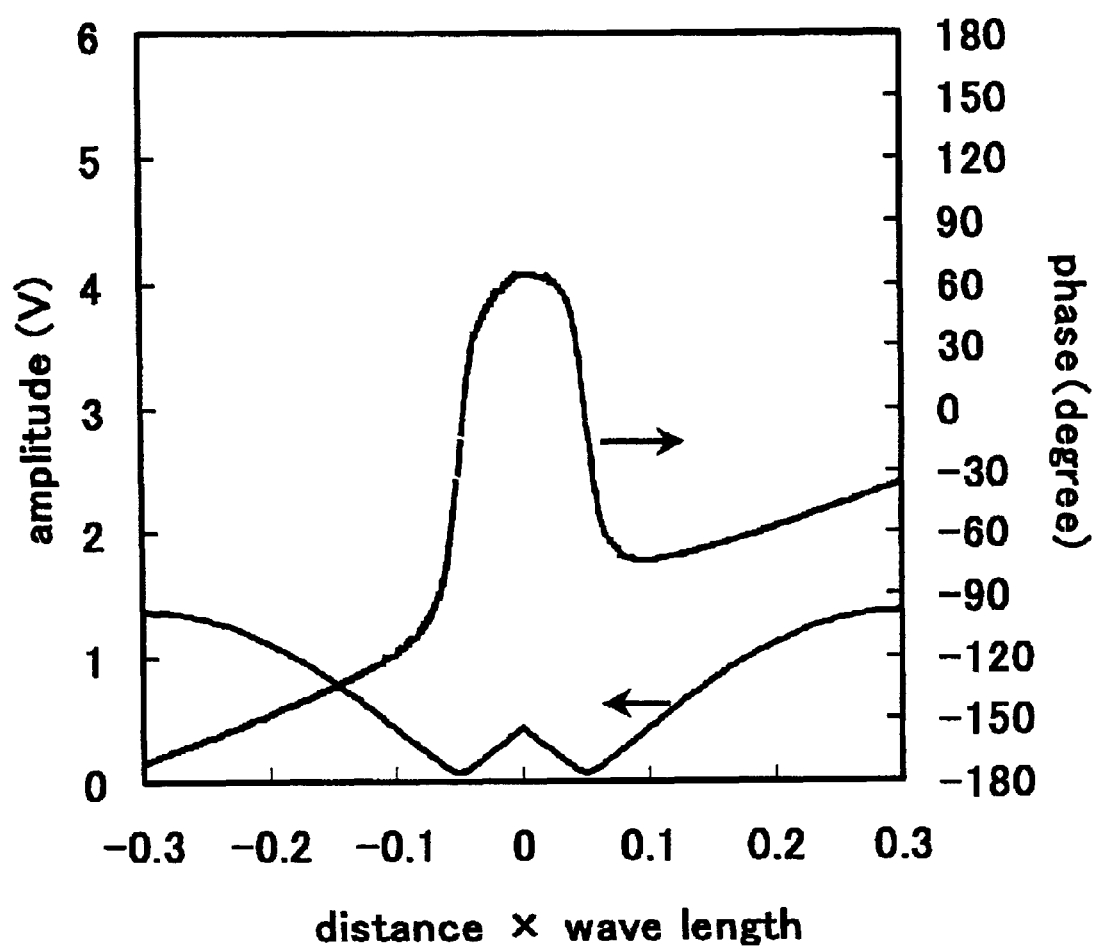
FIG. 16 shows the result of a computer simulation relating to the field strength (solid line) and phase (dotted line) of an electric signal in the modulating electrode in an optical waveguide composed of the open stubs 1 and 5, in a non-optimized case, shown with respect to the coordinate system moving along with the light wave propagating in the waveguide.

FIG. 16 shows the result of a computer simulation using no optimization; that is, one in which the length of the modulation electrode (the combined length of the stubs 1 and 5) is 0.6 times the signal wavelength on the electrode. As can readily be seen from a comparison of FIGS. 15 and 16, optimization increases the potential on the modulation electrode.

EXAMPLE 6

Figure 17A:
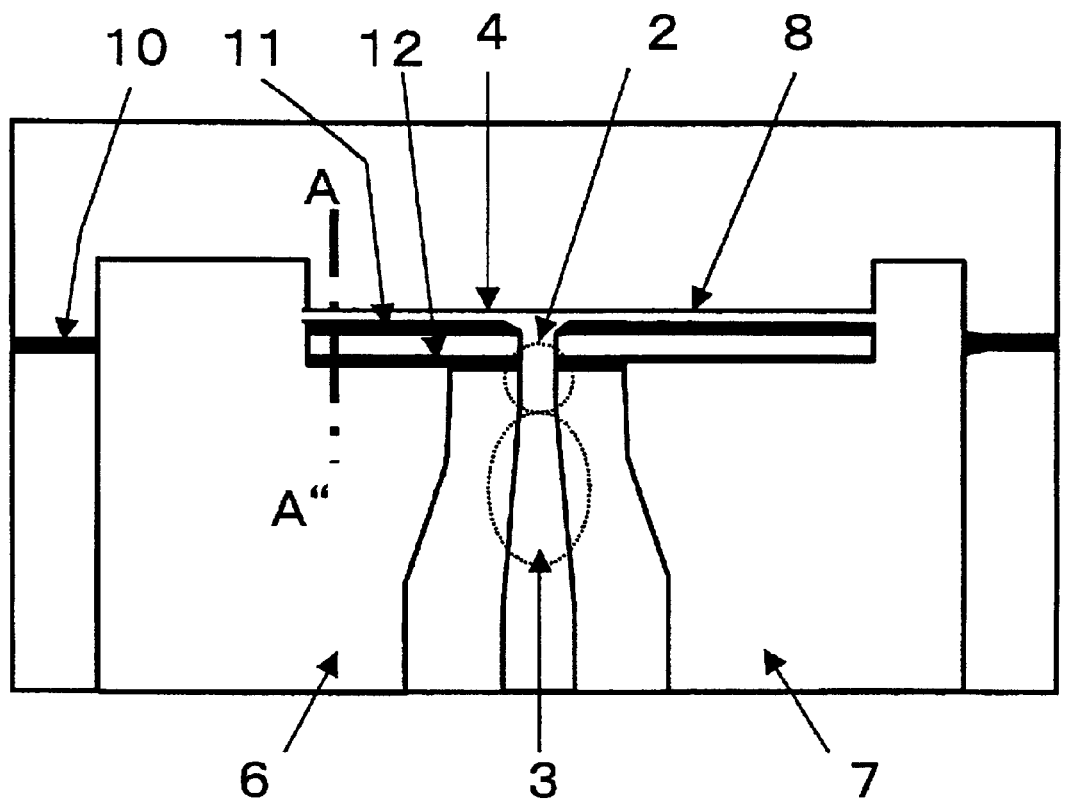
FIG. 17A is a plan view of a resonance type optical modulator in which the modulation electrode is composed of a first short stub on an optical modulator and a second short stub of a different length on the same optical waveguide.
Figure 17B:
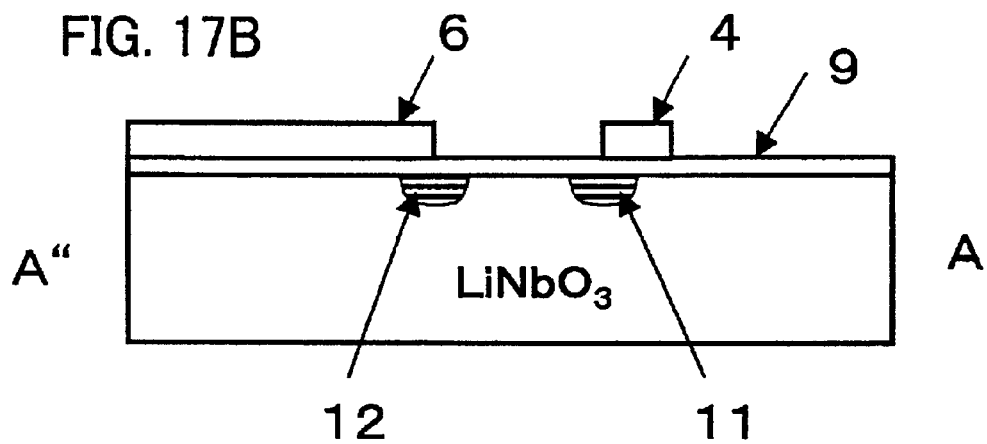
FIG. 17B is a cross-sectional view of the resonance type optical modulator in which the modulation electrode is composed of the first short stub on an optical modulator and a second short stub of a different length on the same optical waveguide.

FIGS. 17A and 17B are plan and cross-sectional views, respectively, of a resonance type optical modulator in which the modulation electrode is comprised of first and second short stubs having different lengths, disposed along the same waveguide. As in the above examples, the resonance type modulator shown is a Mach-Zehnder interferometer type optical modulator that uses a microwave signal having a center frequency of 10 GHz to intensity-modulate a light wave having a wavelength of 1.55 microns. The substrate and sectional structures are the same as those of the first example, so further explanation thereof is omitted.

As described, the modulation electrode is comprised of a short stub 8 and a short stub 4 on the same optical waveguide. The short stub 8 is 5 pm wide and 1710 pm long (including half the width of the wiring line), and is separated from common electrode 7 by a distance 27 pm. This stub length is 0.45 times the wavelength of the microwave modulation signal propagating on the waveguide, and can be set to 0.43 to 0.47 (or 0.92 to 0.95) times the wavelength. The short stub 4 is 5 pm wide and 256 pm long (including half the width of the wiring line), and is separated from common electrode 7 by a distance of 27 pm. The stub length is 0.03 times the wavelength of the microwave modulation signal propagating on the waveguide. As shown in FIG. 17, the electrical feed takes place at the junction between the two stubs. A 100-pm feeding line connection is provided between the junction and a tapered transformer. There is no essential reason to provide this wiring line, which can be omitted. The tapered transformer is to ensure that the incoming signal from the input end of the coplanar waveguide is supplied to the stubs without being reflected back. The tapered transformer is 800 pm long ant tapers from a width of 100 pm to a width of 35 pm, with the distance from the common electrode tapering from 325 pm to 107.5 pm.

An advantage of this configuration is that since the modulation electrode is connected to the common electrode by the stubs, it is not susceptible to interference caused by electrostatic charges and low-frequency signals. The first example has the same advantage, but because in the case of this sixth example the modulation electrode is also connected to the common electrode, it is less susceptible to higher low-frequency signals.

Figure 18A:
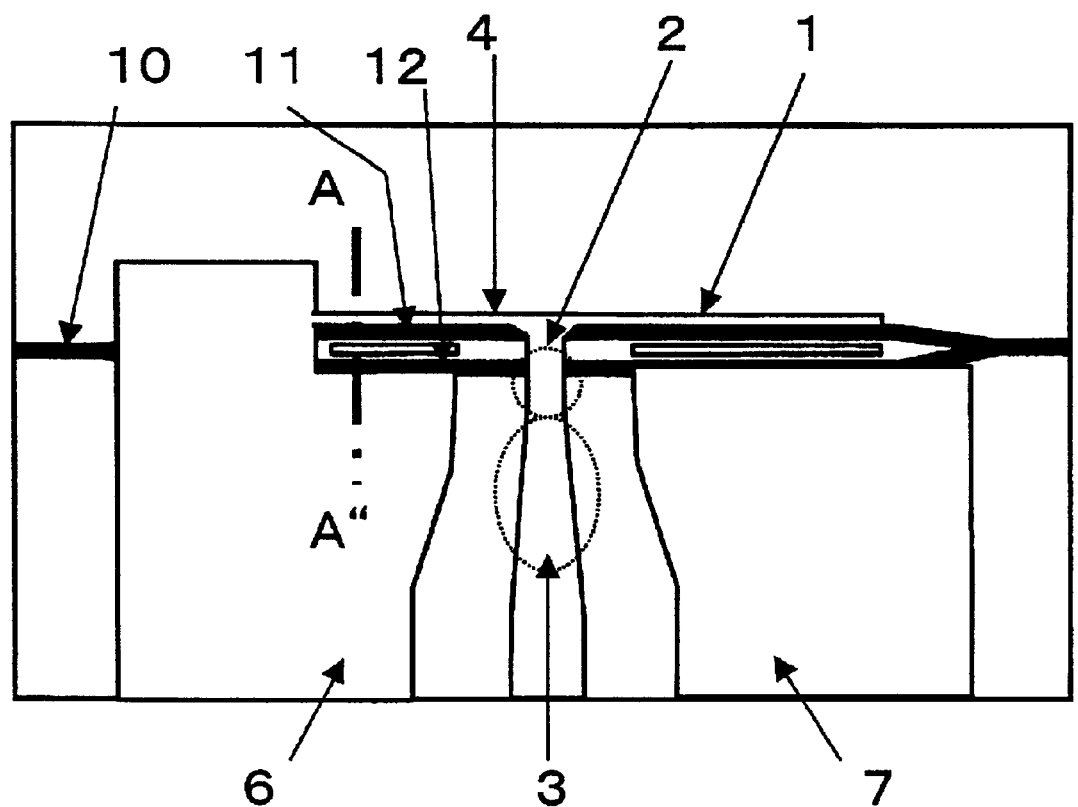
FIG. 18A is a plan view of a modulator in which the modulation electrode is an asymmetric ICPW (Interdigital Coplanar Waveguide).
Figure 18B:
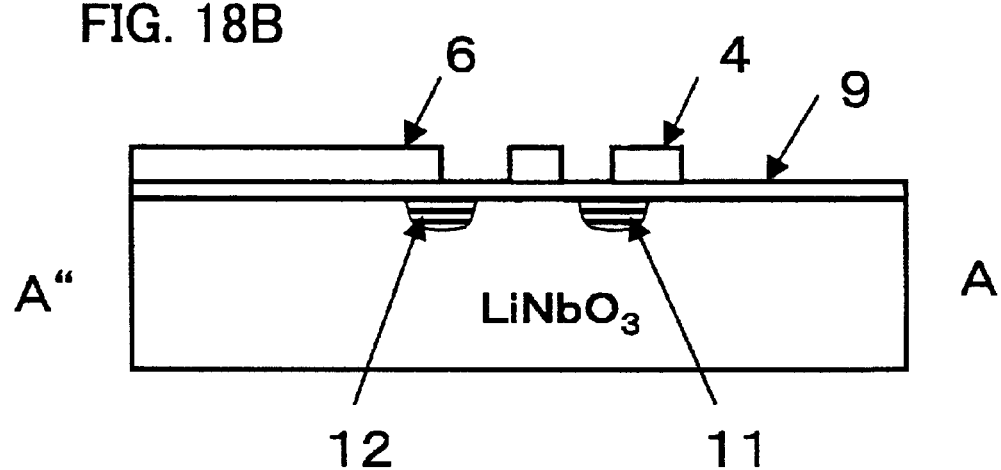
FIG. 18B is a cross-sectional view of the modulator in which the modulation electrode is an asymmetric ICPW (Interdigital Coplanar Waveguide).

The foregoing description has been made with reference to a configuration in which modulation and common electrodes are directly opposed. However, the object of the present invention can also be attained using a conventional ICPW (Interdigital Coplanar Waveguide) comprised by interposing an electrical conductor therebetween to provide a state equivalent to signal isolation. The present invention uses the asymmetric ICPW configuration shown in FIG. 18, that is, a configuration in which, on one side, the common electrode is omitted.

The above embodiments have been described with reference to an intensity modulator. However, since these intensity modulators have the same type of configuration as a polarization modulator that employs the electro-optical effect, it is to be understood that the present invention can also be applied to a polarization modulator. It is also clear that the present invention can also be applied to a phase modulator that uses the electro-optical effect, since modulation is applied to just the light path that has the modulation electrode.

As described in the foregoing, the resonance type optical modulator using a symmetric or asymmetric electrode according to the present invention has the following effects.

In each of the first to ninth inventions, the modulator is easy to fabricate and increases the effective modulation field strength applied to the optical path, making it possible to realize high modulation efficiency with a low level of electric power.

Particularly in the third invention, the configuration also includes bilateral symmetry, eliminating unexpected parasitic oscillation.

Particularly in the fourth invention, the configuration is simple to facilitate the design process.

Particularly in the fifth and sixth inventions, modulation electrodes having different optimum lengths are used and can be selected according to the purpose.

Particularly in the seventh and eighth invention, different stub configurations can be selected according to the absence or presence of direct-current bias and low-frequency bias.

Even with a resonance type optical modulator using an asymmetric electrode and equipped with the points of the ninth, tenth or eleventh invention, the modulator is easy to fabricate and increases the effective modulation field strength applied to the optical path, making it possible to realize high modulation efficiency with a low level of electric power.

What is claimed is:

1. A resonance type optical modulator comprising:
   an optical path having electro-optical effect characteristics;
   a modulation electrode formed along the optical path for applying an electric field to the optical path;
   a common electrode formed in opposition to the modulation electrode;
   a feeding line that is electromagnetically connected to the modulation electrode; and
   stubs connected to the feeding line;
   the feeding line, stubs and common electrode being provided on one side of a region that is divided by the modulation electrode.

2. A resonance type optical modulator according to claim 1, wherein the feeding line includes a tapered transformer.

3. A resonance type optical modulator according to claim 1 or 2, wherein there are an even number of stubs which are positioned symmetrically with respect to the feeding line.

4. A resonance type optical modulator according to claim 3, wherein the common electrode formed in opposition to the modulation electrode is open-ended at both ends.

5. A resonance type optical modulator according to claim 4, wherein the stubs are open stubs.

6. A resonance type optical modulator according to claim 4, wherein the stubs are short stubs.

7. A resonance type optical modulator according to claim 3, wherein the common electrode formed in opposition to the modulation electrode is short-ended at both ends.

8. A resonance type optical modulator according to claim 7, wherein the stubs are open stubs.

9. A resonance type optical modulator according to claim 7, wherein the stubs are short stubs.

10. A resonance type optical modulator according to claim 3, wherein the stubs are open stubs.

11. A resonance type optical modulator according to claim 3, wherein the stubs are short stubs.

12. A resonance type optical modulator according to claim 1, wherein the modulation electrode and feeding line intersect at right-angles and the stubs are positioned adjoining the feeding line and the modulation electrode.

13. A resonance type optical modulator according to claim 1, wherein the common electrode formed in opposition to the modulation electrode is open-ended at both ends.

14. A resonance type optical modulator according to claim 13, wherein the stubs are open stubs.

15. A resonance type optical modulator according to claim 13, wherein the stubs are short stubs.

16. A resonance type optical modulator according to claim 1, wherein the common electrode formed in opposition to the modulation electrode is short-ended at both ends.

17. A resonance type optical modulator according to claim 16, wherein the stubs are open stubs.

18. A resonance type optical modulator according to claim 16, wherein the stubs are short stubs.

19. A resonance type optical modulator according to claim 1, wherein the stubs are open stubs.

20. A resonance type optical modulator according to claim 1, wherein the stubs are short stubs.

21. A resonance type optical modulator comprising:
    an optical path having electro-optical effect characteristics;
    an open stub;
    a short stub that is connected to the open stub;
    a feeding line that is electromagnetically connected to the open stub and the short stub; and
    a common electrode;
    the open stub and short stub being formed along a single optical path to comprise a modulation electrode for applying an electric field to the optical path.

22. A resonance type optical modulator comprising:
    an optical path having electro-optical effect characteristics;
    a first open stub;
    a second open stub having a different length from the first open stub that is connected to the first open stub;
    a feeding line that is electromagnetically connected to the first open stub and the second open stub; and
    a common electrode;
    the first open stub and second open stub being formed along a single optical path to comprise a modulation electrode for applying an electric field to the optical path.

23. A resonance type optical modulator comprising:
    an optical path having electro-optical effect characteristics;
    a first short stub;
    a second short stub having a different length from the first short stub that is connected to the first short stub;
    a feeding line that is electromagnetically connected to the first short stub and the second short stub; and
    a common electrode;
    the first short stub and second short stub being formed along a single optical path to comprise a modulation electrode for applying an electric field to the optical path.

* * * * *